United States Patent
Cheng et al.

(10) Patent No.: US 8,023,078 B2
(45) Date of Patent: Sep. 20, 2011

(54) TRANSFLECTIVE LCD DEVICE

(75) Inventors: Ching-Sheng Cheng, Hsin-Chu (TW);
Li-Ping Liu, Hsin-Chu (TW);
Shih-Chyuan Fan Jiang, Hsin-Chu (TW); Chih-Chun Pei, Hsin-Chu (TW);
Chih-Jen Hu, Hsin-Chu (TW);
Ching-Huan Lin, Hsin-Chu (TW);
Chih-Ming Chang, Hsin-Chu (TW)

(73) Assignee: Au Optronics Corp., Hsinchu (TW)

( * ) Notice: Subject to any disclaimer, the term of this patent is extended or adjusted under 35 U.S.C. 154(b) by 377 days.

(21) Appl. No.: 12/181,620

(22) Filed: Jul. 29, 2008

(65) Prior Publication Data
US 2009/0059142 A1 Mar. 5, 2009

(30) Foreign Application Priority Data
Aug. 28, 2007 (TW) ................................ 96131920 A

(51) Int. Cl.
*G02F 1/1335* (2006.01)
(52) U.S. Cl. ........................................................ 349/114
(58) Field of Classification Search ........................ None
See application file for complete search history.

(56) References Cited

U.S. PATENT DOCUMENTS

| | | | | |
|---|---|---|---|---|
| 6,313,899 | B1 * | 11/2001 | Wu et al. | 349/130 |
| 6,452,654 | B2 * | 9/2002 | Kubo et al. | 349/114 |
| 2004/0252262 | A1 * | 12/2004 | Park | 349/114 |
| 2005/0168674 | A1 * | 8/2005 | Kubo | 349/114 |

FOREIGN PATENT DOCUMENTS

JP          2007-086446 A          4/2007

OTHER PUBLICATIONS

Machine translation of JP 2007-086446.*

* cited by examiner

*Primary Examiner* — Lucy P Chien
(74) *Attorney, Agent, or Firm* — Birch, Stewart, Kolasch & Birch, LLP

(57) ABSTRACT

A transflective LCD device includes an array substrate and a color filter. The substrate includes a plurality gate lines, a plurality of common lines, and a plurality of data lines substantially crossing the gate lines to define a plurality of sub-pixel regions. Each sub-pixel region has a reflective area and a transmissive area. Two of the reflective area of two adjacent sub-pixel regions in the same column are juxtaposed to each other. The color filter has a plurality of sub-pixel regions respectively aligned with the sub-pixel regions of the array substrate. The color filter includes an insulating layer disposed on the reflective area of a respective sub-pixel region. An LC layer is disposed between the array substrate and the color filter.

3 Claims, 7 Drawing Sheets

TRANSFLECTIVE LCD DEVICE

BACKGROUND OF THE INVENTION

(1) Field of the Invention

The present invention relates to an LCD (liquid crystal display) device, and more specifically to a transflective LCD device.

(2) Description of the Prior Art

Due to development in the technology, multi-media products, such as mobile phones, notebook computers, digital cameras, PDAs and display screens, become more common and the demand for LCD (liquid crystal display) device is increasing day-by-day.

The LCD device can be generally classified into three types, namely: (1) transmissive (2) reflective and (3) transflective depending on supply of the light source. A backlight module is used in the transmissive LCD device and consumes a great amount of power source. Under the high ambient light (i.e. sunlight), the device has poor display ability. In the reflective type, the transmissive electrode layer is replaced by the reflective electrode layer and the device generally depends on the ambient light as the light source. Therefore, no backlight module is utilized in the reflective LCD device, but the latter suffers from non-uniform reflective brightness, thereby causing insufficient of the reflective brightness and cannot be operated under the dark environment. The transflective LCD device simultaneously has transmissive and reflective regions in order to avoid the disadvantages encountered during use of the transmissive and reflective LCD devices.

The transflective LCD structure includes an array substrate, a color filter (CF), and a liquid crystal (LC) layer. The array substrate includes a plurality of sub-pixel regions. Each sub-pixel region has a transmissive area and a reflective area. The CF has a plurality of sub-pixel regions, which are respectively aligned with the sub-pixel regions of the array substrate. The CF includes an insulating layer disposed on the reflective area of each sub-pixel region. The liquid crystal display layer is disposed between the array substrate and the color filter.

Presently, there are two transflective types. In the first type, the insulating layer is disposed on the color filter. In the second type, the insulating layer is disposed on the array substrate. The insulating layer is also called the adjustment layer since it is used to alter the thickness of the LCD layer in the reflective and transmissive areas.

Referring to FIG. 1a, a conventional transflective LCD is shown. Transflective LCD includes an array substrate 120, a color filter 110 (will be named CF later), an LC layer 130. The array substrate 120 includes a plurality of sub-pixel regions 100. Each sub-pixel region 100 has a reflective area 102 and a transmissive area 101.

The CF 110 includes a plurality of sub-pixel regions, which are respectively aligned with the sub-pixel regions 100 in the array substrate 120. Each sub-pixel region in the CF 110 has an insulating layer 140 aligned with the reflective area 102. The liquid crystal display layer 130 is disposed between the array substrate 120 and the color filter 110. An optical film 150 is further disposed on an external surface of the CF 110. Each of the sub-pixel regions 100 in the CF 110 has Red; Green and Blue colors arranged in the row manner and a plurality of the sub-pixel regions 100 cooperatively form the image on the display panel.

The array substrate 120 includes a plurality of TFTs (thin film transistor) (not shown in the drawing). The array substrate 120 further includes a reflective electrode 170 disposed on the reflective area 102 and a transmissive electrode 160 disposed on the transmissive area 101 of each of the sub-pixel regions 100. In addition, a backlight module 180 is disposed below the array substrate 120.

The external light and the backlight module 180 cooperatively supply light source to the transflective LCD panel. Flow of current through the TFTs (not numbered in the drawing) results in change of electric field between the array substrate 120 and the CF 110, thereby causing turning of the crystal molecules within the LCD layer 130, which, in turn, alters the polarization thereof such that the optical film 150 filters the different biasing light beams so as to achieve the respective brightness in each pixel. When no current is passed through the TFTs, no change is caused in the electric field such the crystal molecules within the LCD layer 130 extend vertically, thereby totally preventing passing of the light beams through the LCD layer 130.

Since the insulating layer 140 has two inclined structures at two sides; the crystal molecules thereat extend in predetermined angles, thereby forming light leakage regions 103 respectively. The light beams passing the leakage regions 103 are partially prevented and partially allowed, thereby lowing the image contrast.

Referring to FIG. 1b, another conventional transflective LCD is shown. Transflective LCD includes an array substrate 120, a CF 110, an LC layer 130 and generally similar to that of FIG. 1a. The only difference resides in that the insulating layer 140 is disposed on the reflective area 102 of the array substrate 120. This conventional transflective LCD works similar to the previous structure, and has the light leakage problem.

When using within a housing or outside of the housing, the transflective LCD panel is provided with appropriate brightness depending on the light strength of the surrounding. In case of dark state due to the light leakage in the LCD layer, the image contrast of the display panel will get lower.

Referring again to FIGS. 1a and 1b, the array substrate 120 further includes a plurality gate lines 121 and a plurality of common lines 122 generally and respectively parallel to the gate lines 121. Each common line 122 is disposed in an adjoining area between two adjacent sub-pixel regions 100 while each of the gate lines 121 is disposed between the reflective and transmissive electrodes 170, 160 of the respective sub-pixel region 100 with the reflective electrode 170 spanning across the gate line 121. A predetermined gap is defined between the reflective electrode 170 and the transmissive electrode 160 of each sub-pixel region 100 in order to prevent electrical communication therebetween.

Since no shielding is provided to cover the gap formed between the reflective and transmissive electrodes 170, 160 of the respective sub-pixel region 100, a Black Matrix 111 is provided on the CF 110 aligned with the gap so as to prevent occurrence of light leakage. According to the prior art technology, though the Black Matrix 111 can effectively prevent the light leakage between the reflective and transmissive electrodes 170, 160 of the respective sub-pixel region 100, but reduces the aperture ratio of the LCD panel.

SUMMARY OF THE INVENTION

The object the present invention is to provide a transflective LCD device, in which, dark-state light leak problem is eliminated so as to enhance the image contrast as well as the aperture ratio.

The transflective LCD device of the present invention includes an array substrate, a CF and a liquid crystal display layer. An insulating layer (also called adjustment layer) is disposed either on the CF or the array substrate. The transflective LCD device is classified into two categories based on the formation of the insulating layer relative to the CF or the array substrate.

In the first category, the insulating layer is disposed on the CF. The array substrate includes a plurality gate lines, a plurality of common lines, and a plurality of data lines.

The common lines are disposed generally and respectively parallel to the gate lines. The data lines respectively and transversely cross the gate lines to define a plurality of sub-pixel regions. Each sub-pixel region includes a reflective area and a transmissive area, wherein two reflective areas of two adjacent sub-pixel regions in the same row are juxtaposed and consecutive to each other.

The color filter has a plurality of sub-pixel regions respectively aligned with the sub-pixel regions in the array substrate. The color filter includes an insulating layer disposed on the reflective area of a respective one of the sub-pixel regions opposite to the array substrate. The liquid crystal display layer disposed between the array substrate and the color filter.

Since the crystal molecules on two inclined sides of the insulating layer are not properly arranged, a plurality of light leakage areas are formed. In the conventional transflective LCD panel, each sub-pixel region has two light leakage areas. However, in the transflective LCD device of the present invention, only one light leakage area is present since two reflective areas of two adjacent sub-pixel regions are Juxtaposed to each other. Thus, the image contrast of the transflective LCD device of the present invention is increased.

As far as the aperture ratio is concerned, the transflective LCD panel of the present invention has high aperture ratio since one light leakage area is reduced in each of the sub-pixel regions. In addition, since only one light leakage area is remained on the inclined sides of the insulating layer, the unbalance alignment of the crystal molecules due to turning when current passed through is consequently reduced, thereby achieving the desired alignment of the crystal molecules.

In the second category, the insulating layer is disposed on the array substrate such that the transflective LCD device works similar to the first category. The only difference resides in that the insulating layer is disposed on the reflective area of the respective sub-pixel region in the array substrate opposite to the CF.

Due to the present design, the reflective and transmissive areas of two adjacent sub-pixel regions are juxtaposed to each other, thereby reducing the uneven area of the insulating layer. Thus, the alignment of the crystal molecules within the LCD layer is not disturbed due to the reduction of the uneven area in the insulating layer, but results in lesser light leakage areas, which, in turn, increases the image contrast of the transflective LCD panel of the present invention.

BRIEF DESCRIPTION OF THE DRAWINGS

The present invention will now be specified with reference to its preferred embodiment illustrated in the drawings, in which:

FIG. 3b is a cross-sectional view taken along the lines A-A' in FIG. 3a;

DESCRIPTION OF THE PREFERRED EMBODIMENTS

A transflective LCD device of the present invention is constructed in order to improve the dark-state light leakage problem encountered in the conventional transflective LCD device so as to raise the aperture ratio thereof.

The transflective LCD device of the present invention includes an array substrate, a color filter and a liquid crystal display layer. In addition, an insulating layer is disposed either on the color filter or the array substrate. Depending on formation of the insulating layer, the transflective LCD device of the present invention can be classified into two types.

Figure 1A:
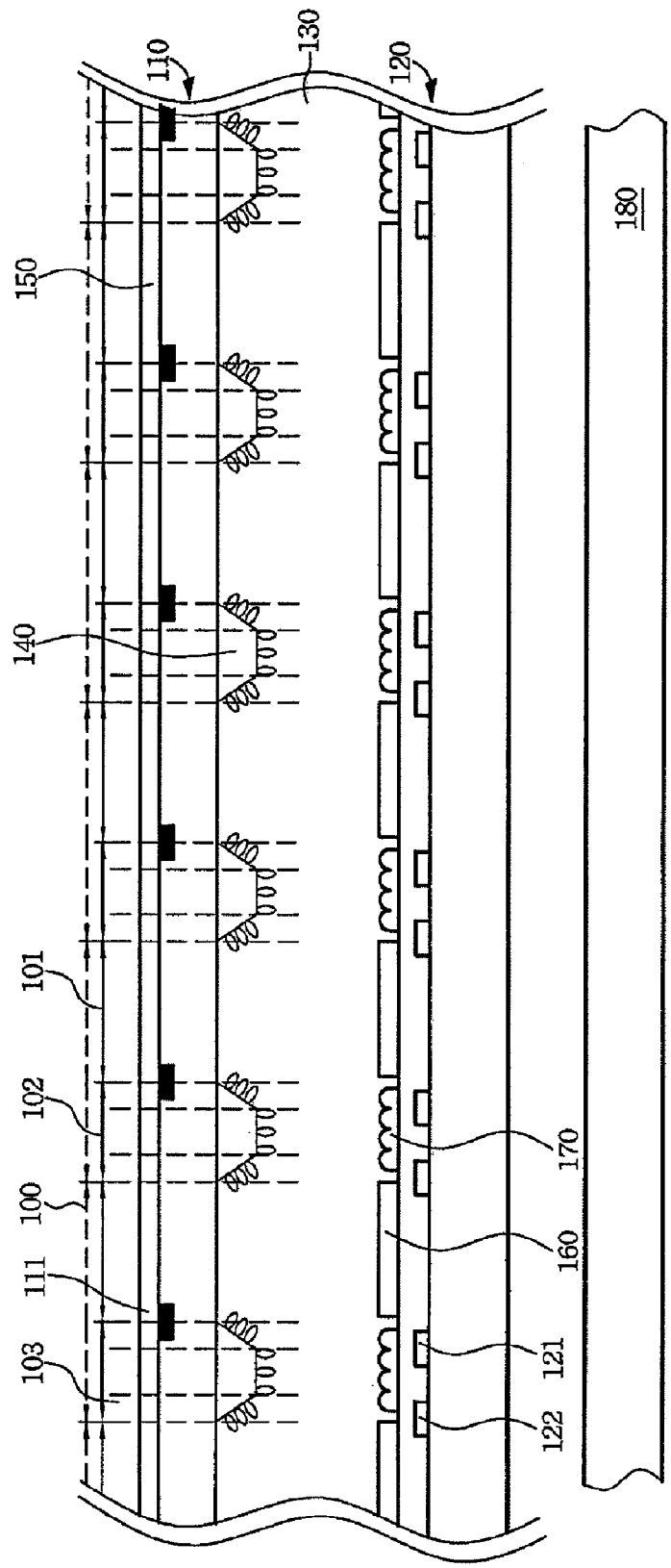
FIG. 1a is a conventional LCD (liquid crystal display) device, in which, an insulating layer is disposed on a color filter.
Figure 1B:
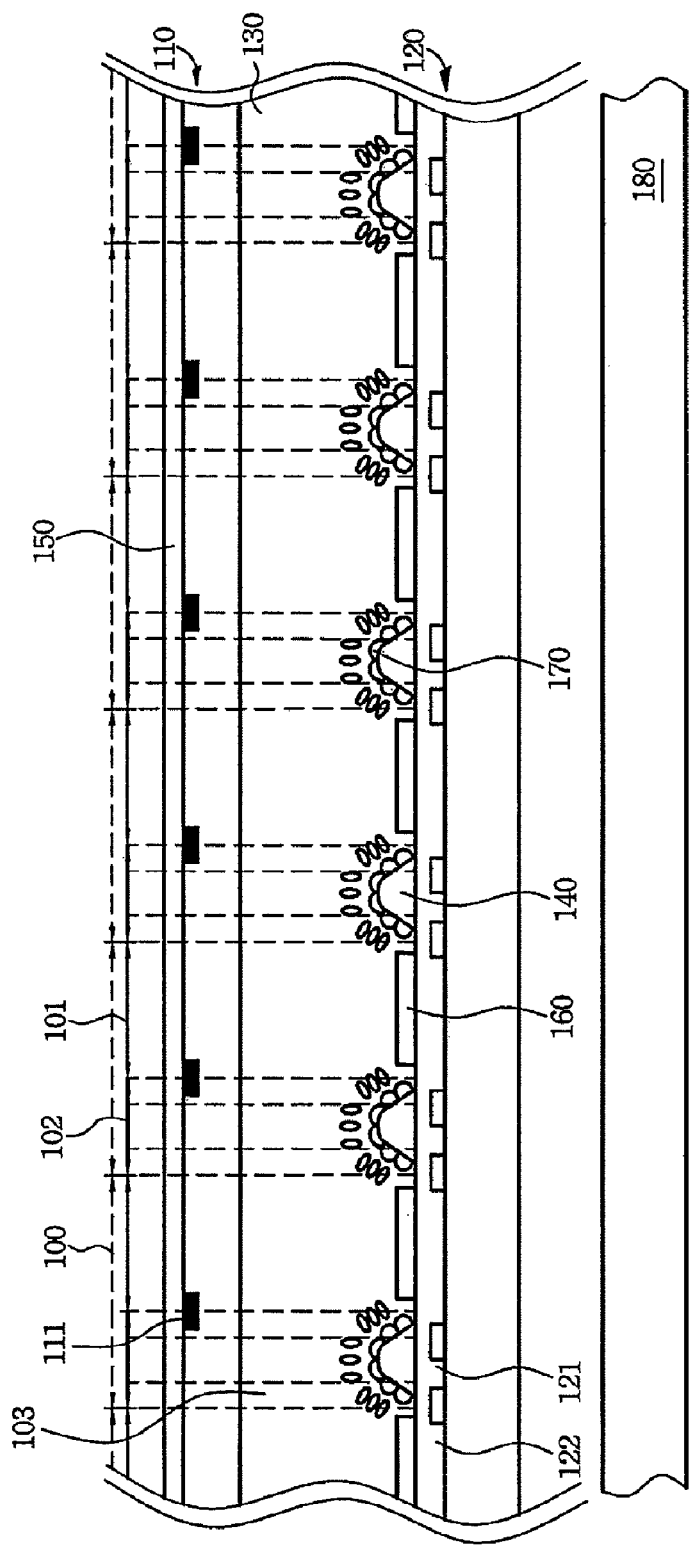
FIG. 1b is a conventional LCD (liquid crystal display) device, in which, an insulating layer is disposed on an array substrate.
Figure 2A:
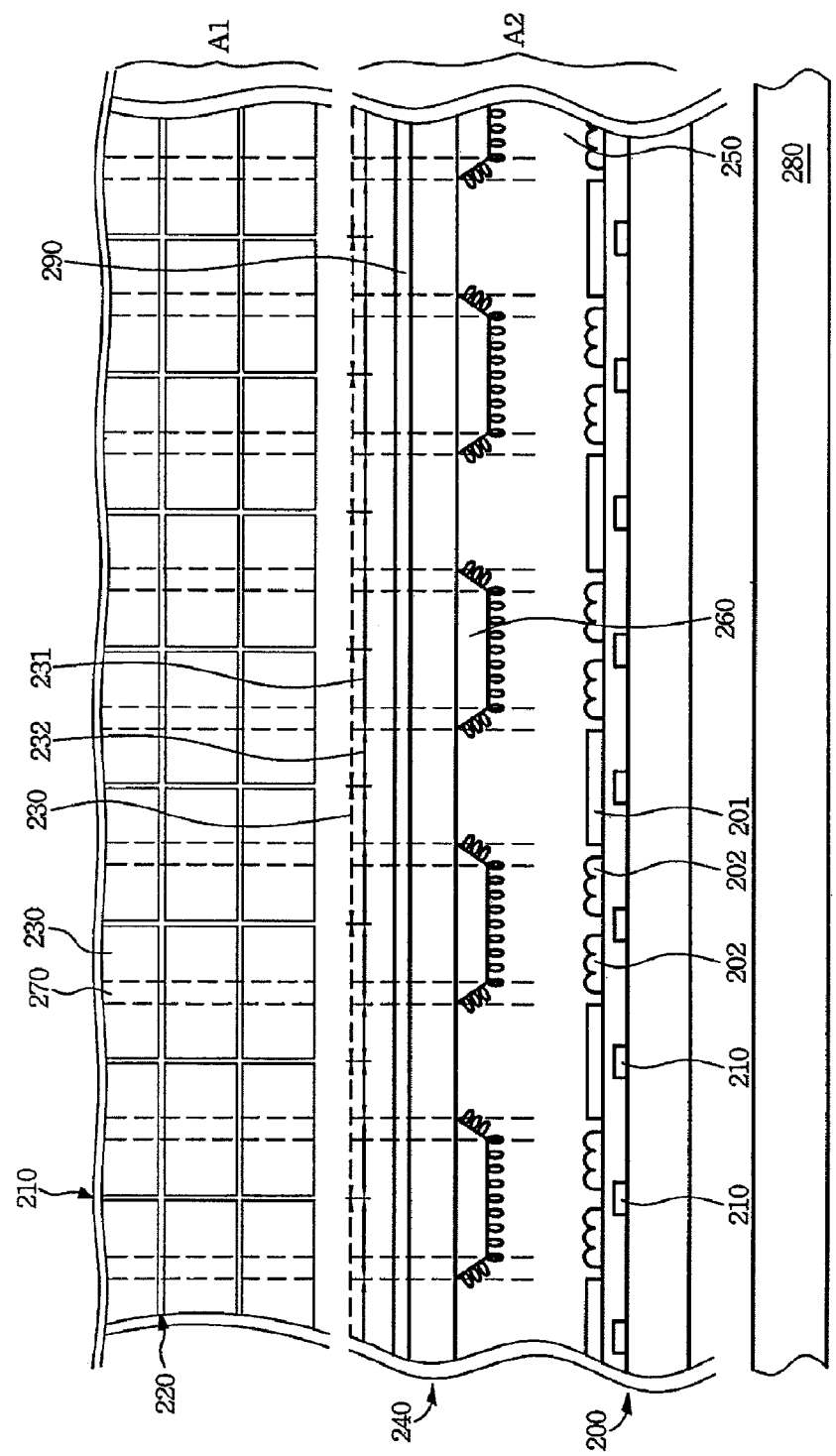
FIG. 2a is an LCD device of the present invention, in which, the insulating layer is disposed on the color filter.

FIG. 2a shows a first type transflective LCD device of the present invention, in which, the insulating layer 260 is disposed on the color filter 240. The array substrate 200 accordingly includes a plurality gate lines 210, a plurality of common lines (not shown) substantially parallel to the gate lines, and a plurality of data lines 220.

Referring FIG. 2a, a top view A1 is shown, wherein the common lines (not shown) are disposed substantially parallel to the gate lines 210 while the data lines 220 respectively and perpendicularly cross the gate lines 220 to define a plurality of sub-pixel regions 230.

Referring FIG. 2a, the cross sectional view A2 of the LCD device shows that each sub-pixel region 230 has a reflective area 231 and a transmissive area 232. Two of the reflective areas 231 of two adjacent the sub-pixel regions 230 in the same row are juxtaposed to each other. LC layer 250 corresponding to the reflective areas 231 of two adjacent the sub-pixel regions 230 has the same thickness. LC layer 250 corresponding to the transmissive areas 232 has the same thickness.

The array substrate 200 further includes a plurality of TFTs (thin film transistor) (not shown). Each of the TFTs is correspondingly connected to one of the data lines 220. The array substrate 200 further includes a transmissive electrode 201 and a reflective electrode 202. The transmissive electrode 201 is disposed on the transmissive area 232 of each of the sub-pixel regions 230 and is made of ITO (indium tin oxide) or IZO (indium zinc oxide). The reflective electrode 202 is disposed on the reflective area 231 of each of the sub-pixel regions 230 and is made of Aluminum, Silver or a combination thereof. In addition, the transflective LCD device of the present invention includes a backlight module 280 disposed below the LCD panel.

The color filter 240 also has a plurality of sub-pixel regions 230 (may be the same number of the array substrate 220) respectively aligned with the sub-pixel regions 230 in the array substrate 200. Each of sub-pixel regions 230 in the color filter 240 includes an insulating layer 260 disposed at a position in each sub-pixel region 230 opposite to the reflective area 231 of the array substrate 200. The insulating layer 260 has a thickness ranging from 1 µm to 3 µm, preferably 1.6 µm to 2.2 µm in the present embodiment. In addition, an optical film 290 is disposed on an external surface of the color filter 240. The LC layer 250 is disposed between the array substrate 200 and the color filter 240.

As shown in the FIGs, the light leakage area 270 are formed due to inappropriate arrangement of the crystal molecules at two inclined sides of the insulating layer 260. The conventional transflective LCD device generally has two light leakage areas.

In the transflective LCD device of the present embodiment, since two reflective areas 231 of two adjacent sub-pixel regions 230 in the same row are juxtaposed to each other, there is only one light leakage area 270 in each sub-pixel region 230, thereby tremendously increasing the aperture ratio. Since only one light leakage section 270 is remained at two inclined sides of the insulating layer 260, the unbalance brightness caused by alignment of the crystal molecules within the LC layer 250 is greatly reduced. In other words, the alignment of the crystal molecules is closed to the predetermined arranged state.

The sub-pixel regions 230 in the color filter 240 has a Red sub-pixel region, a Green sub-pixel region and a Blue sub-pixel region. In other words, the Red, Green and Blue sub-pixel regions cooperatively form one pixel unit. In one embodiment, the color of the sub-pixel region in the color filter 240 could be Red, Green, Blue, Aquamarine, Magenta or Yellow.

The backlight module 280 is disposed below and parallel to the LCD panel for supply of light source such that when current is allowed to flow through the TFTs, alteration of the electric field between the array substrate 200 and the color filter 240 results in turning of the crystal molecules within the LC layer 250, thereby correcting the polarization of the light beams, which are finally filtered by the optical film 290 so as to achieve the required brightness in each of the pixel unit. In other words, the color filter 240 provides a specific color to each of the pixel units. Thus, the different colors in the pixel units cooperatively form an image in the LCD panel.

Figure 2B:
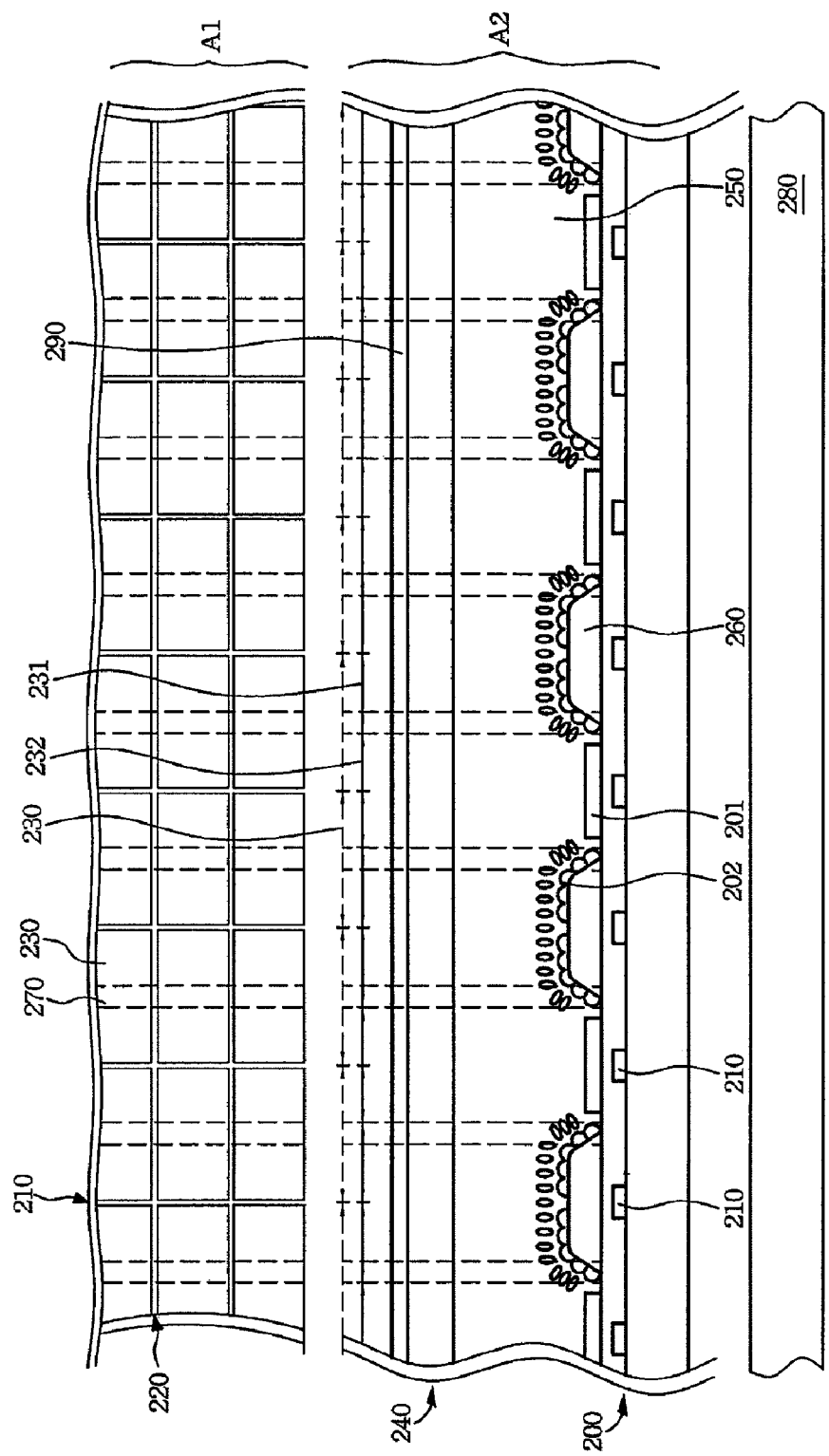
FIG. 2b is an LCD device of the present invention, in which, the insulating layer is disposed on the array substrate.

FIG. 2b shows the second type transflective LCD device of the present invention, in which, the insulating layer 260 is disposed on the array substrate 200. The array substrate 200 accordingly includes a plurality of gate lines 210, a plurality of common lines (not shown), and a plurality of data lines 220.

Referring to FIG. 2b, a top view of the LCD device is shown as A1, wherein the common lines (not shown) are disposed substantially parallel to the gate lines 210 while the data lines 220 respectively and perpendicularly cross the gate lines 220 to define a plurality of sub-pixel regions 230.

Referring to FIG. 2b, the cross sectional view of the LCD device is shown as A2. Each sub-pixel region 230 has a reflective area 231 and a transmissive area 232. Two of the reflective areas 231 of two adjacent the sub-pixel regions 230 in the same row are juxtaposed to each other. The reflective area 231 is provided with the insulating layer 260 that has a thickness ranging from 1 µm to 3 µm, preferably 1.6 µm to 2.2 µm in one embodiment. Note that, LC layer 250 corresponding to the adjacent reflective areas 231 has the same thickness. LC layer 250 corresponding to the transmissive areas 232 have the same thickness which may be greater than that corresponding to the adjacent reflective areas 231.

The array substrate 200 further includes a plurality of TFTs (thin film transistor) (not shown). Each of the TFTs is connected to a respective one of the data lines 220. The array substrate 200 further includes a transmissive electrode 201 and a reflective electrode 202. The transmissive electrode 201 is disposed on the transmissive area 232 of each of the sub-pixel regions 230 and is made from ITO (indium tin oxide) or IZO (indium zinc oxide). The reflective electrode 202 is disposed on the reflective area 231 of each of the sub-pixel regions 230 and is made of Aluminum, Silver or a combination of both. In addition, the transflective LCD device of the present invention includes a backlight module 280 disposed parallel to and below the LCD panel.

The color filter 240 also has a plurality of sub-pixel regions 230 (may be the same number of the array substrate 220) respectively aligned with the sub-pixel regions 230 in the array substrate 200. In addition, an optical film 290 is disposed on an external surface of the color filter 240 while the LCD layer 250 is disposed between the array substrate 200 and the color filter 240.

The second type transflective LCD device is generally the same as the first type in structure. The only difference resides in that the insulating layer 260 is disposed on the reflective area 231 of the respective sub-pixel region 230 in the array substrate 200 or in the color filter 240.

Figure 2C:
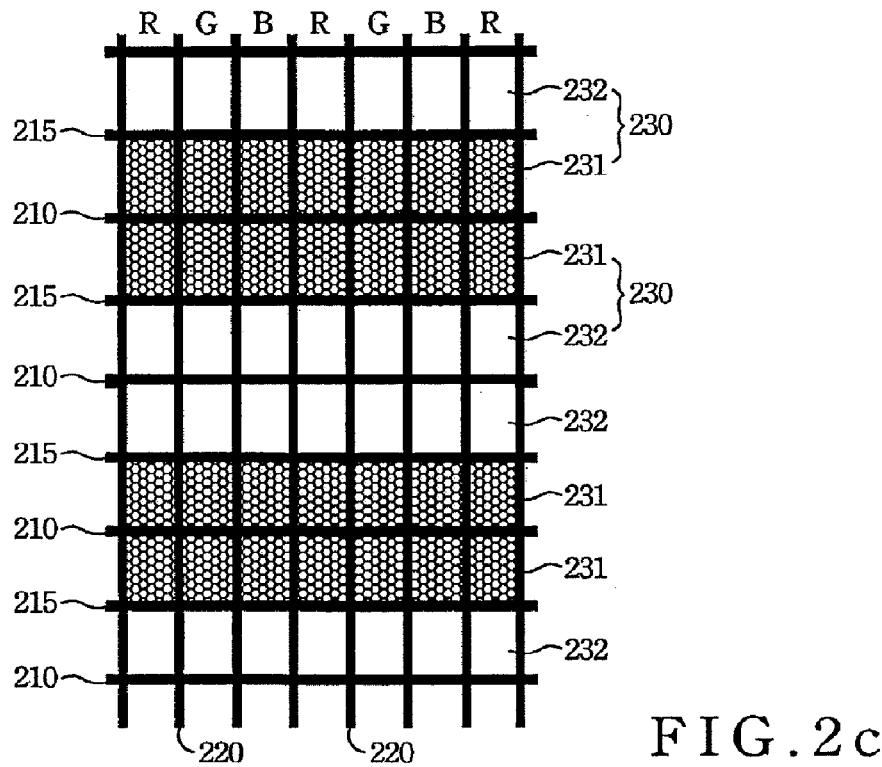
FIG. 2c is a top view of the LCD device of the present invention.

Referring to FIG. 2c, a top planar view of the transflective LCD device of the present invention is shown, wherein the insulating layer is disposed either on the color filter or the array substrate. The transflective LCD device accordingly includes a plurality of the gate lines 210, a plurality of common lines (not shown) are disposed substantially parallel to the gate lines 210, and a plurality of data lines 220 respectively and perpendicularly cross the gate lines 220 to define a plurality of sub-pixel regions 230.

Note that each sub-pixel region 230 has a reflective area 231 and a transmissive area 232, wherein two of the reflective areas 231 of two adjacent the sub-pixel regions 230 in the same row are juxtaposed to each other. In addition, in one embodiment, the sub-pixel regions 230 in the same row could be the Red, Green and Blue sub-pixel regions arranged consecutively. However, in the same column, the sub-pixel regions 230 has the same color.

Moreover, the reflective area 231 of one of the sub-pixel regions 230 in the same column is juxtaposed to the reflective area 231 of another one of the sub-pixel regions 230 adjacent to the one of the sub-pixel regions 230. As best shown in FIG. 2c, the reflective areas 231 of two adjacent sub-pixel regions 230 along the up-and-down direction are juxtaposed to each other, and/or the reflective areas 231 of two adjacent sub-pixel regions 230 along the left-and-right direction are juxtaposed to each other.

Figure 3A:
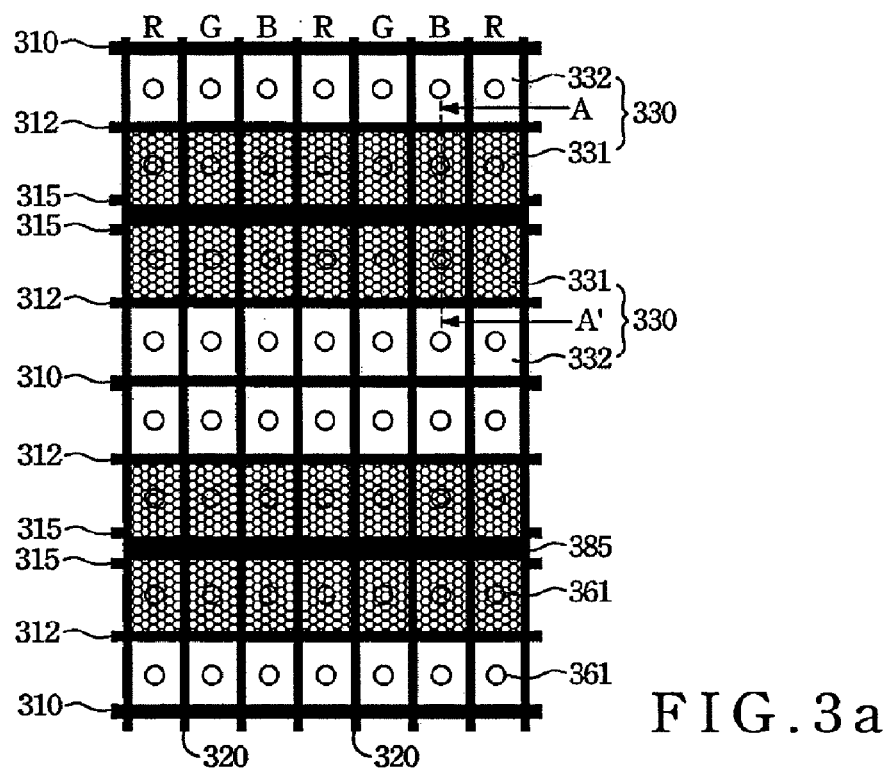
FIG. 3a illustrates another embodiment of the LCD device of the present invention.

FIG. 3a illustrates a top planar view of another embodiment of the LCD device of the present invention, wherein the insulating layer is disposed either on the color filter or the array substrate. The transflective LCD device accordingly includes a plurality of the gate lines 315, a plurality of first common lines 310 disposed substantially parallel to the gate lines 315 and a plurality of data lines 320 respectively and perpendicularly cross the gate lines 315, wherein the gate line 315 and the first common line 310 are arranged one alternate to each other within the LCD panel. The gate lines 315, the first common lines 310 and the data lines 320 transversely cross one another to define a plurality of sub-pixel regions 330.

Each sub-pixel region 330 has a reflective area 331 and a transmissive area 332. Two of the reflective areas 331 of two adjacent sub-pixel regions 330 in the same row are juxtaposed to each other. Note that in the present embodiment, in each sub-pixel region 330, a respective gate line 315 is disposed in the reflective area 331. Two adjacent gate line 315 are in reflective area 331 of adjacent sub-pixel regions 330. The transflective LCD device of the present invention further includes a plurality of second common lines 312 generally parallel to the gate lines 315 and the first common lines 310. Each of the second common lines 312 is disposed between the transmissive area 332 and the reflective area 331 of each sub-pixel region 330.

Moreover, the reflective area 331 of one of the sub-pixel regions 330 in the same column is juxtaposed to the reflective area 331 of another one of the sub-pixel regions 330 adjacent to the one of the sub-pixel regions 330 as shown in FIG. 3a. In another embodiment, the reflective areas 331 of one sub-pixel region 330 in the same column could be juxtaposed to the transmissive area 332 of an adjacent sub-pixel region 330.

Figure 3B:
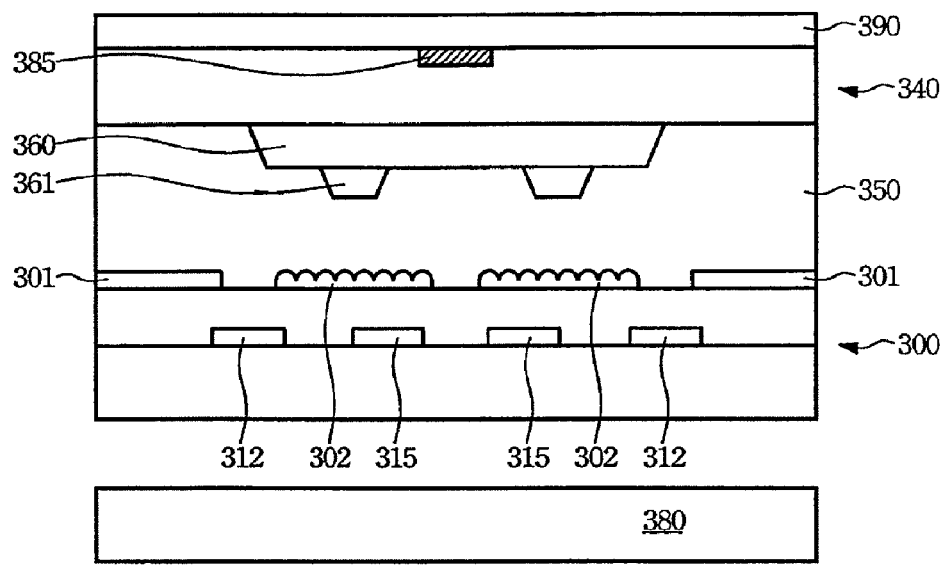

FIG. 3b is a cross-sectional view taken along the lines A-A' in FIG. 3a to illustrate two adjacent sub-pixel regions 330, wherein the insulating layer 360 is of the color filter 340 in this embodiment. The transflective LCD device accordingly includes an array substrate 300, a CF 340, and an LC layer 350 disposed between the array substrate 300 and the CF 340. The backlight module 380 is disposed below and parallel to the LCD panel while the optical film 390 is disposed on the external surface of the CF 340.

The array substrate 300 includes a reflective electrode 302 and a transmissive electrode 301 disposed respectively on the reflective area 331 and the transmissive area 332 of each sub-pixel region 330. Since the reflective areas 331 of two adjacent sub-pixel regions 330 are consecutively formed, two reflective electrodes 302 of the adjacent sub-pixel regions 330 are also located adjacent to each other while two adjacent transmissive and reflective electrodes 302, 301 are spaced apart from each other by a gap. However, the design should not be limited only to this structure.

Referring again to FIG. 3b, the array substrate 300 further includes a plurality of second common lines 312 and a plurality of gate lines 315. Each second common line 312 is disposed between and below the reflective electrode 302 and the transmissive electrode 301 of each sub-pixel region 330 so as to prevent the occurrence of light leakage. Each gate line 315 is disposed below the reflective electrode 302 of the respective sub-pixel region 330 such that the reflective electrode 302 spans entirely across the respective gate line 315 from above. Since the reflective electrodes 302 of two adjacent sub-pixel regions 330 are spaced apart by a gap, a Black Matrix 385 is of the CF 340 in alignment with the gap so as to prevent the occurrence of light leakage thereat.

Note that only one Black Matrix 385 is disposed between two adjacent sub-pixel regions 330 in the above embodiment, the aperture ratio thereof is greatly increased.

In the above embodiment, the insulating layer 360 is located below the CF 340. Thus, each insulating layer 360 falls between two reflective areas 331 of two adjacent sub-pixel regions 330.

In order to shorten the response time of the liquid crystal display layer and provide simultaneously a wide viewing angle, the LCD panel of the transflective LCD device of the present invention is generally designed in MVA (multi-domain vertical alignment) mode. Therefore, at least one protrusive block 361 is disposed on the insulating layer 360 or the CF 340 of each sub-pixel region 330, thereby forming multi-domains. In one preferred embodiment, the insulating layer 360 disposed on the reflective area 331 of each sub-pixel region 330 is provided with one protrusive block 361. In the same manner, the CF 340 disposed on the transmissive area 332 of each sub-pixel region 330 is provided with one protrusive block 361.

Figure 4A:
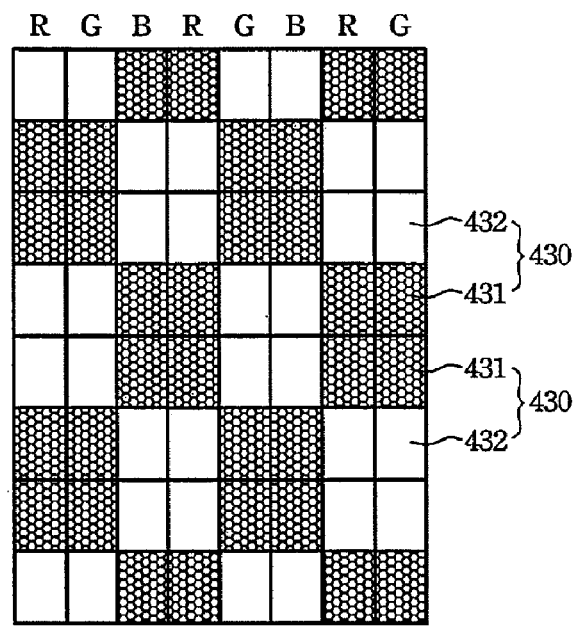
FIG. 4a illustrates a first modification of the LCD device of the present invention.

FIG. 4a illustrates a first modification of the transflective LCD device of the present embodiment. As illustrated, two reflective areas 431 of two adjacent sub-pixel regions 430 in the same column are juxtaposed to each other. Two consecutive sub-pixel regions 430 in the same row form one unit. Two of the reflective areas 431 in the same unit are consecutive. The reflective area 431 of one unit is juxtaposed to the transmissive area 432 of another one unit adjacent to the preceding one unit in the same row.

The feature of the above embodiment is that the reflective area 431 and the transmissive area 432 in the same row or in the same column are alternately arranged so that the display panel may not have the dark-state phenomenon, thereby providing a better display ability for the complicated pattern.

Figure 4B:
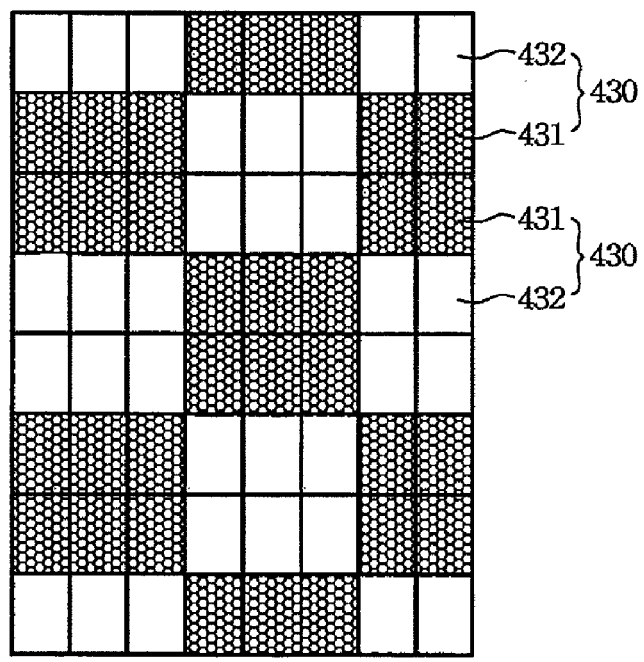
FIG. 4b illustrates a second modification of the LCD device of the present invention.

FIG. 4b illustrates a second modification of the LCD device of the present invention. As shown, two reflective areas 431 of two adjacent sub-pixel regions 430 in the same column are juxtaposed to each other. Three consecutive sub-pixel regions 430 in the same row form one unit. Three of the reflective areas 431 in the same unit are consecutive. In the same row, the reflective area 431 of one unit is juxtaposed to the transmissive area of another one unit adjacent to preceding one unit in the same row.

Figure 4C:
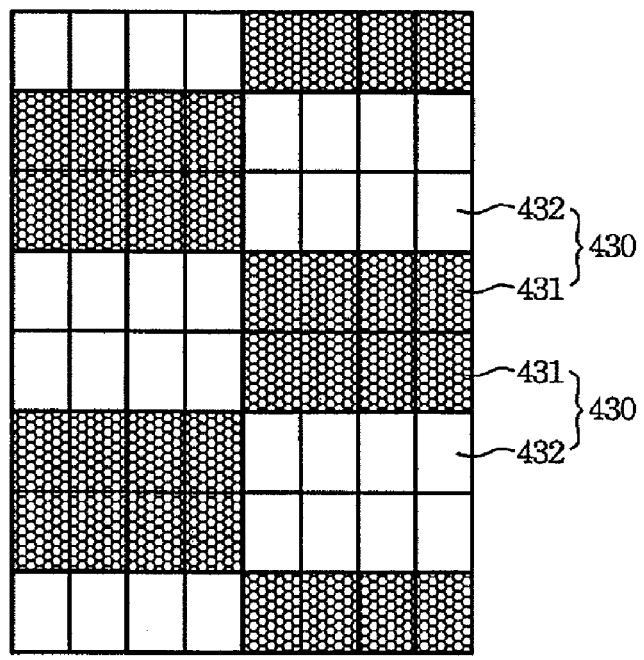
FIG. 4c illustrates a third modification of the LCD device of the present invention.

FIG. 4c illustrates a third modification of the LCD device of the present invention. As illustrated, two reflective areas of two adjacent sub-pixel regions 430 in the same column are juxtaposed to each other. Four sub-pixel regions in the same row form one unit such that four of the reflective areas 431 in the unit are consecutively formed. In the same row, the reflective area and the transmissive area of the adjacent units are juxtaposed to each other.

Due to proposed plan of the present invention, the reflective area and the transmissive area of two adjacent sub-pixel regions are juxtaposed to each other such that the overall area of the insulating layer is reduced, which, in turn, does not affect the alignment of the crystal molecules, thereby lowering the dark-state light leakage and tremendously increasing the image contrast.

In addition, since the transmissive area and the reflective area of two adjacent sub-pixel regions are oppositely arranged, two adjacent sub-pixel regions only require one piece of Black Matrix, by which the aperture ratio greatly enhanced for each of the sub-pixel region.

With the example and explanations above, the features and spirits of the invention are hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A transflective LCD panel comprising:
an array substrate including:
a plurality gate lines;
a plurality of first common lines substantially parallel to said gate lines;
a plurality of second common lines substantially parallel to said gate lines; and
a plurality of data lines respectively and transversely crossing said gate lines to define a plurality of sub-pixel regions, each of said sub-pixel regions having a reflective area and a transmissive area, wherein two of said reflective areas of adjacent sub-pixel regions in the same row are juxtaposed to each other, wherein each of said second common lines is disposed substantially between said transmissive area and said reflective area of the same sub-pixel region;

a color filter having a plurality of sub-pixel regions respectively aligned with said sub-pixel regions of said array substrate, wherein said color filter includes an insulating layer disposed on each said sub-pixel region aligned with said reflective area; and a liquid crystal display layer disposed between said array substrate and said color filter, wherein each of said first common lines is disposed substantially between said transmissive area of one of said sub-pixel regions and said transmissive area of another one of said sub-pixel regions adjacent to said one of said sub-pixel regions in the same column.

2. The transflective LCD panel according to claim 1, wherein said reflective area of one of said sub-pixel regions in the same column is juxtaposed to said reflective area of another one of said sub-pixel regions adjacent to said one of said sub-pixel regions.

3. The transflective LCD panel according to claim 1, wherein three consecutive said sub-pixel regions in the same row form one unit, three of said reflective areas in the same unit being consecutive, said reflective area of one of said sub-pixel regions being juxtaposed to said transmissive area of another one of said sub-pixel regions adjacent to said one of said sub-pixel regions in the same column.

* * * * *